(12) United States Patent
Takeuchi et al.

(10) Patent No.: US 7,369,109 B2
(45) Date of Patent: May 6, 2008

(54) LIQUID CRYSTAL DISPLAY DEVICE AND DRIVING METHOD THEREOF

(75) Inventors: Masakazu Takeuchi, Mie (JP); Takashi Morimoto, Nara (JP); Yasuki Mori, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 608 days.

(21) Appl. No.: 10/845,333

(22) Filed: May 14, 2004

(65) Prior Publication Data
US 2005/0146646 A1     Jul. 7, 2005

(30) Foreign Application Priority Data
May 15, 2003  (JP) ............................. 2003-137223
Apr. 27, 2004  (JP) ............................. 2004-130622

(51) Int. Cl.
G09G 3/36     (2006.01)
G02F 1/1343   (2006.01)
G02F 1/136    (2006.01)

(52) U.S. Cl. ........................... 345/92; 345/93; 349/38; 349/42

(58) Field of Classification Search .......... 345/55–100, 345/204–214; 349/19–166
See application file for complete search history.

(56) References Cited

U.S. PATENT DOCUMENTS 6,667,777 B2 * 12/2003 Kikkawa et al. .............. 349/38
6,956,633 B2 * 10/2005 Okada et al. .................. 349/44
2001/0019322 A1 * 9/2001 Nakayama et al. ......... 345/100

FOREIGN PATENT DOCUMENTS

| JP | 7-218930    | 8/1995  |
|----|-------------|---------|
| JP | 7-311390    | 11/1995 |
| JP | 8-146464    | 6/1996  |
| JP | 9-015622    | 1/1997  |
| JP | 10-274783   | 10/1998 |
| JP | 2000-227611 | 8/2000  |

* cited by examiner

*Primary Examiner*—David L. Lewis
(74) *Attorney, Agent, or Firm*—Harness, Dickey & Pierce, P.L.C.

(57) ABSTRACT

A liquid crystal display device includes a group of first signal lines ( . . . , Sm−1, Sm, Sm+1, . . . ) arranged in parallel, a group of second signal lines ( . . . , Gn−1, Gn, Gn+1, . . . ) and a group of auxiliary capacity wirings ( . . . , Csn−1, Csn, Csn+1, . . . ) alternately arranged one by one in parallel so as to intersect with the group of the first signal lines, a plurality of pixel electrodes arranged in a pixel region, an auxiliary electrode connected to each of the pixel electrodes, and a TFT element corresponding to each of the pixel electrodes. The auxiliary electrode has a portion forming a capacitor by overlapping with auxiliary capacity wiring Csn and a portion forming a capacitor by overlapping with second signal line Gn−1.

23 Claims, 9 Drawing Sheets

LIQUID CRYSTAL DISPLAY DEVICE AND DRIVING METHOD THEREOF

This nonprovisional application is based on Japanese Patent Applications Nos. 2003-137223 and 2004-130622 filed with the Japan Patent Office on May 15, 2003 and Apr. 27, 2004, respectively, the entire contents of which are hereby incorporated by reference.

BACKGROUND OF THE INVENTION

1. Field of the Invention

The present invention relates to an active matrix liquid crystal display device widely used for OA or AV equipment, and a driving method thereof.

2. Description of the Background Art

A liquid crystal display device generally has a structure such that, a liquid crystal layer is sandwiched between an opposed electrode and a pixel electrode. In particular, in an active matrix liquid crystal display device, numbers of pixel electrodes are arranged in a matrix. To display an image in the active matrix liquid crystal display device, a picture signal is successively provided to the numbers of pixel electrodes arranged two-dimensionally in a matrix, on a column-by-column basis. Hereinafter, this process is referred to as "scanning". At a timing when the scanning reaches a certain column of the pixel electrodes, a voltage as a picture signal is applied simultaneously to all of the pixel electrodes belonging to the column, and a potential difference held at that time in each pixel electrode for the opposed electrode must be kept to a sufficient degree until next scanning comes to the column of the pixel electrodes. As a capacitance (which is also referred to as "a liquid crystal capacity", generally indicated with "Clc") resulting from a liquid crystal between the pixel electrode and the opposed electrode is usually not sufficient, a technique is known to give the pixel electrode an auxiliary capacity (generally indicated with "Cs") to help charge keeping of the pixel electrode. More specifically, to give the auxiliary capacity, it is contemplated that a portion of the pixel electrode is arranged so as to overlap with another wiring or the like with interposed dielectric.

Techniques disclosed in Japanese Patent Laying-Open No. 10-274783 and No. 7-311390 are examples of conventional techniques regarding the auxiliary capacity. In these techniques, one pixel region is divided into a plurality of pixel electrodes, and one of the pixel electrodes has a portion overlapping with capacity wiring to achieve an auxiliary capacity as a so-called Cs on Common, while another pixel electrode has a portion overlapping with a gate signal line for an adjacent pixel to achieve an auxiliary capacity as a so-called Cs on Gate. Each of the divided pixel electrodes has a TFT (Thin Film Transistor) element for driving. An object of the techniques in Japanese Patent Laying-Open No. 10-274783 and No. 7-311390 is to improve a visual angle characteristic of a liquid crystal display device by providing a plurality of regions having different auxiliary capacity components within one pixel.

Other relational conventional techniques include Japanese Patent Laying-Open No. 7-218930 and No. 9-15622 as examples of Cs on Common, and Japanese Patent Laying-Open No. 8-146464 and No. 2000-227611 as examples of Cs on Gate.

Generally, auxiliary capacity Cs is achieved with the aforementioned two systems, Cs on Gate and Cs on Common.

FIG. 17 shows a circuit diagram of Cs on Gate. Cs on Gate means that the auxiliary capacity is retained between a pixel electrode or an auxiliary electrode having the same potential as the pixel electrode and a gate signal line Gn−1 for an adjacent pixel region. A portion enclosed with dotted line in FIG. 17 indicates a position in the circuit construction occupied with the pixel electrode or the auxiliary electrode having the same potential as the pixel electrode.

FIG. 18 shows a circuit diagram of Cs on Common. Cs on Common means that the auxiliary capacity is retained between a pixel electrode or an auxiliary electrode having the same potential as the pixel electrode and auxiliary capacity wiring Cs. Auxiliary capacity wiring Cs is wiring arranged between gate signal lines to achieve Cs on Common structure. Thus, the gate signal lines and auxiliary capacity wirings are alternately arranged one by one.

Both of the two systems Cs on Gate and Cs on Common have respective merits and demerits, and are selected corresponding to specific needs. One of the merits of Cs on Gate is that, there is no need to arrange a new capacity line, as a gate signal line of an adjacent pixel of each pixel is used as wiring to achieve the auxiliary capacity. In addition, as an arrangement of an additional capacity line is not required, an aperture ratio is not decreased. One of the demerits, however, is that, as a load for auxiliary capacity Cs is applied to the gate signal line of the adjacent pixel, power supply efficiency during a gate-off time (a state of a voltage being VGL) becomes lower and a current consumption is increased. On the other hand, one of the merits of Cs on Common is a small current consumption. One of the demerits is a decreased aperture ratio, as the auxiliary capacity wiring must be additionally arranged only for achieving the auxiliary capacity.

As a liquid crystal has permittivity anisotropy, liquid crystal capacity Clc varies depending on a voltage applied to the liquid crystal. Thus, a direct current component originally held by a potential of the pixel electrode changes with the picture signal. As a result, an undesired direct current component is newly generated. When a direct current voltage is applied to the liquid crystal by the direct current component generated as such, a flicker (flickering or shaking of a screen) occurs. In addition, if the direct current component is generated, an after image is formed, which may be resulting from formation of an electric double layer on an interface between an alignment layer and the liquid crystal. Furthermore, a response property of a picture is known to be degraded because liquid crystal capacity Clc changes with the applied voltage.

Sufficiently large auxiliary capacity Cs can suppress the above-described problems caused by a variation in liquid crystal capacity Clc and can enhance performance of the liquid crystal display device. The auxiliary capacity, however, is not sufficiently large in any of the techniques in aforementioned six references.

SUMMARY OF THE INVENTION

An object of the present invention is to provide a liquid crystal display device which can ensure an auxiliary capacity of a sufficient size, and a driving method thereof.

To attain the above-described object, one aspect of a liquid crystal display device according to the present invention includes a group of first signal lines arranged in parallel, a group of second signal lines and a group of auxiliary capacity wirings alternately arranged one by one in parallel so as to intersect with the group of the first signal lines, a plurality of switching elements arranged corresponding to intersection points of the first signal lines and the second signal lines, a plurality of auxiliary electrodes connected to the plurality of switching elements, and a pixel electrode formed on the auxiliary electrode and electrically connected to the auxiliary electrode, wherein the auxiliary electrode has a portion forming a capacitor by overlapping with the auxiliary capacity wiring and a portion forming a capacitor by overlapping with the second signal line. By adopting this construction, as both of a portion forming an auxiliary capacity as Cs on Gate by overlapping of the auxiliary electrode having the same potential as the pixel electrode with a gate signal line, and a portion forming an auxiliary capacity as Cs on Common by overlapping of the auxiliary electrode with the auxiliary capacity wiring are present, the auxiliary capacity can increase.

To attain the above-described object, another aspect of the liquid crystal display device according to the present invention includes a group of first signal lines arranged in parallel, a group of second signal lines and a group of auxiliary capacity wirings alternately arranged one by one in parallel so as to intersect with the group of the first signal lines, a plurality of pixel electrodes arranged in a pixel region defined as each region enclosed with two of the group of the first signal lines which are adjacent with each other and two of the group of the second signal lines which are adjacent with each other, an auxiliary electrode connected to each of the pixel electrodes, and a thin film transistor corresponding to each of the pixel electrodes, wherein the thin film transistor has one side of a source and a drain connected to the first signal line, the other side connected to the auxiliary electrode, and a gate side connected to the second signal line, and the auxiliary electrode has a portion forming a capacitor by overlapping with the auxiliary capacity wiring and a portion forming a capacitor by overlapping with the second signal line. By adopting this construction, as both of a portion forming an auxiliary capacity as Cs on Gate by overlapping of the auxiliary electrode having the same potential as the pixel electrode with a gate signal line, and a portion forming an auxiliary capacity as Cs on Common by overlapping of the auxiliary electrode with the auxiliary capacity wiring are present, the auxiliary capacity can increase.

In the present invention, it is preferable that each of the plurality of pixel electrodes includes the corresponding auxiliary electrode and the thin film transistor, and one of the group of the second signal lines located in an end position of one side has a portion forming a capacitor by overlapping with the auxiliary electrode and is not connected to any of the thin film transistor. By adopting this construction, when the group of the second signal lines is a group of gate signal lines, for example, the construction has a dummy gate signal line, and thus the auxiliary capacity can increase even in one of pixels for display which is located in an end position.

In the present invention, it is preferable that each of the pixel electrodes includes the corresponding auxiliary electrode and the thin film transistor, and a picture signal is not applied to the pixel electrode located between two of the group of the second signal lines in first and second positions from an end of one side. By adopting this construction, the construction has a dummy pixel electrode, and thus the auxiliary capacity can increase even in one of pixels for display which is located in an end position.

To attain the above-described object, in a driving method of a liquid crystal display device according to the present invention, in the above-described liquid crystal display device, when a group of second signal lines are indicated with G0, G1, G2, ..., Gp in order of arrangement position, a picture signal to be displayed is successively applied to G1 to Gp in one vertical period, and a constant potential is applied to G0. By adopting this method, the liquid crystal display device having a construction including a dummy gate signal line and an increased auxiliary capacity can be driven efficiently.

To attain the above-described object, in a driving method of a liquid crystal display device according to the present invention, in the above-described liquid crystal display device, when a column of the pixel electrodes located between two of the group of the second signal lines in first and second positions from an end of one side is made to be a dummy pixel electrode column and the other columns of the pixel electrodes are made to be active pixel electrode columns, the driving method comprises the steps of selecting a column one by one in order of arrangement position over all of the active pixel electrode columns, providing a potential corresponding to content of a picture to be displayed to the selected one column of the pixel electrodes, providing a constant potential to the other columns of the pixel electrodes, and repeating such scanning from one end to the other end of an arrangement of the active pixel electrode columns, while continuously providing the constant potential to the dummy pixel electrode. By adopting this method, the liquid crystal display device having a construction including a dummy pixel electrode and an increased auxiliary capacity can be driven efficiently.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

As the techniques disclosed in aforementioned Japanese Patent Laying-Open No. 10-274783 and No. 7-311390 are to achieve an auxiliary capacity with either Cs on Gate or Cs on Common for each of pixel electrodes divided in a plurality, only one of Cs on Gate and Cs on Common can be used for one pixel electrode and, as a result, the auxiliary capacity is not sufficiently large. It is to be noted that, an object of the techniques disclosed in aforementioned Japanese Patent Laying-Open No. 10-274783 and No. 7-311390 is to improve the visual angle characteristic and not to increase the auxiliary capacity, and thus a viewpoint of increasing the auxiliary capacity is not considered at all.

In contrast, inventors of the present invention focused attention on the object of increasing the auxiliary capacity, which is absolutely different from that of prior arts, and attained the present invention to achieve an increased auxiliary capacity.

First Embodiment

Figure 1:
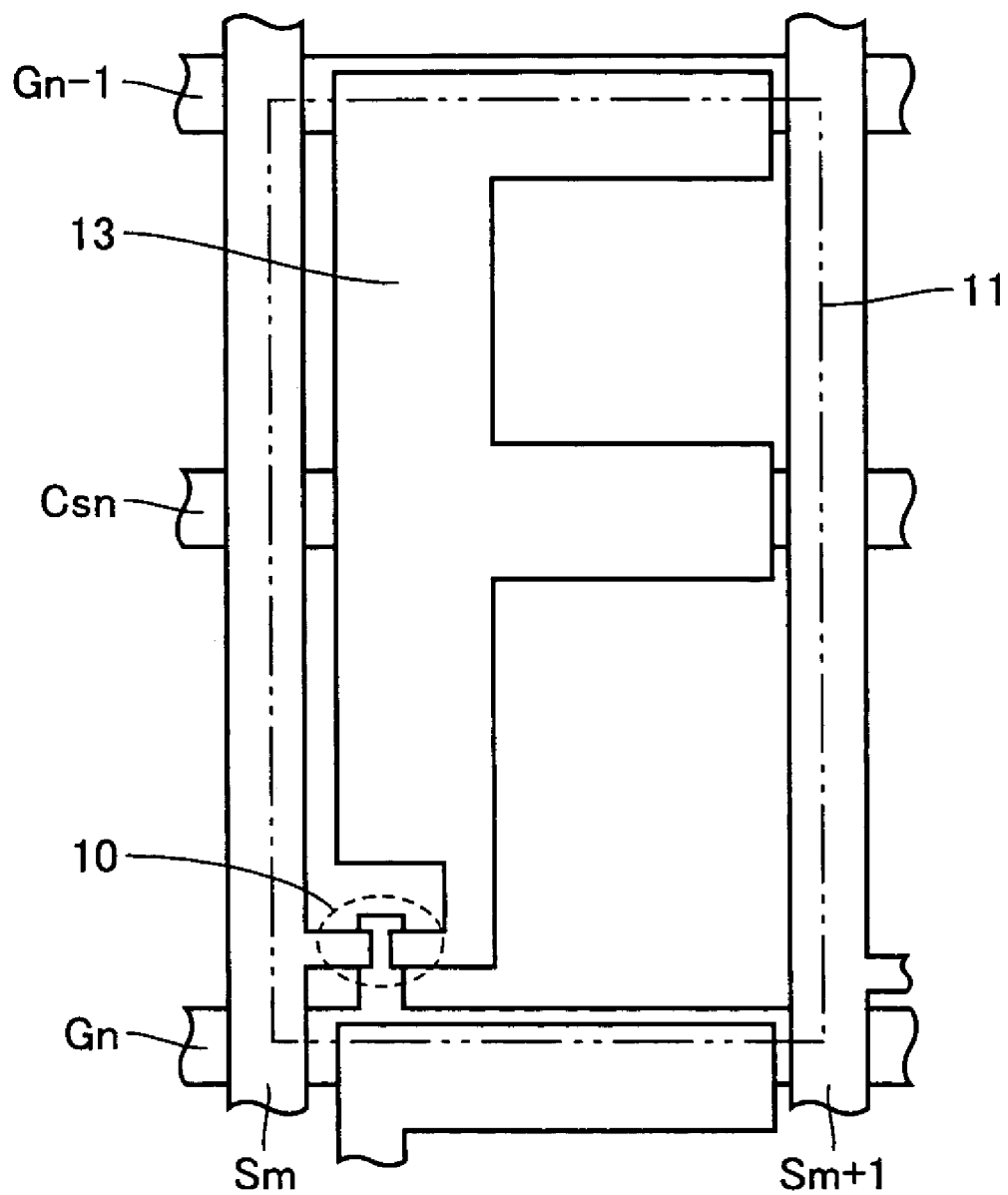
FIG. 1 is an enlarged plan view corresponding to one pixel of a liquid crystal display device in a first embodiment according to the present invention.

A liquid crystal display device in a first embodiment according to the present invention will now be described referring to FIGS. 1-3. FIG. 1 is an enlarged plan view of one pixel region of the liquid crystal display device. The liquid crystal display device includes a group of source signal lines ( . . . , Sm−1, Sm, Sm+1, . . . ) as first signal lines. It also includes a group of gate signal lines ( . . . , Gn−1, Gn, Gn+1, . . . ) as second signal lines and a group of auxiliary capacity wirings ( . . . , Csn−1, Csn, Csn+1, . . . ) arranged in parallel so as to intersect with the group of the first signal lines. The gate signal lines and the auxiliary capacity wirings are alternately arranged one by one in parallel.

One pixel region is defined as a region enclosed with two of the group of the source signal lines which are adjacent with each other, that is, Sm and Sm+1, and two of the group of the gate signal lines which are adjacent with each other, that is, Gn−1 and Gn. As pluralities of source signal lines and gate signal lines are arranged, a plurality of pixel regions are defined in a display region of the liquid crystal display device. In each of the pixel regions, a pixel electrode 11 is arranged so as to cover the pixel region. Only one pixel electrode 11 is shown in FIG. 1. As each of the plurality of pixel regions has the same construction, a structure within one pixel region is described in the following.

Pixel electrode 11 is located on a forward side of a paper surface as compared with an auxiliary electrode 13. The liquid crystal display device includes auxiliary electrode 13 connected so as to continuously have the same potential as pixel electrode 11, and a thin film transistor element (hereinafter referred to as a "TFT element") 10 arranged corresponding to pixel electrode 11. TFT element generally has three terminals of source, drain and gate, and in this liquid crystal display device, one side of the source and drain is connected to the first signal line, while the other side is connected to the auxiliary electrode, and a gate side is connected to the second signal line. More specifically, TFT element 10 has a source side connected to source signal line Sm, a drain side connected to auxiliary electrode 13, and a gate side connected to gate signal line Gn. One auxiliary electrode 13 has both of a portion forming a capacitor by overlapping with auxiliary capacity wiring Csn and a portion forming a capacitor by overlapping with gate signal line Gn−1.

Figure 2:
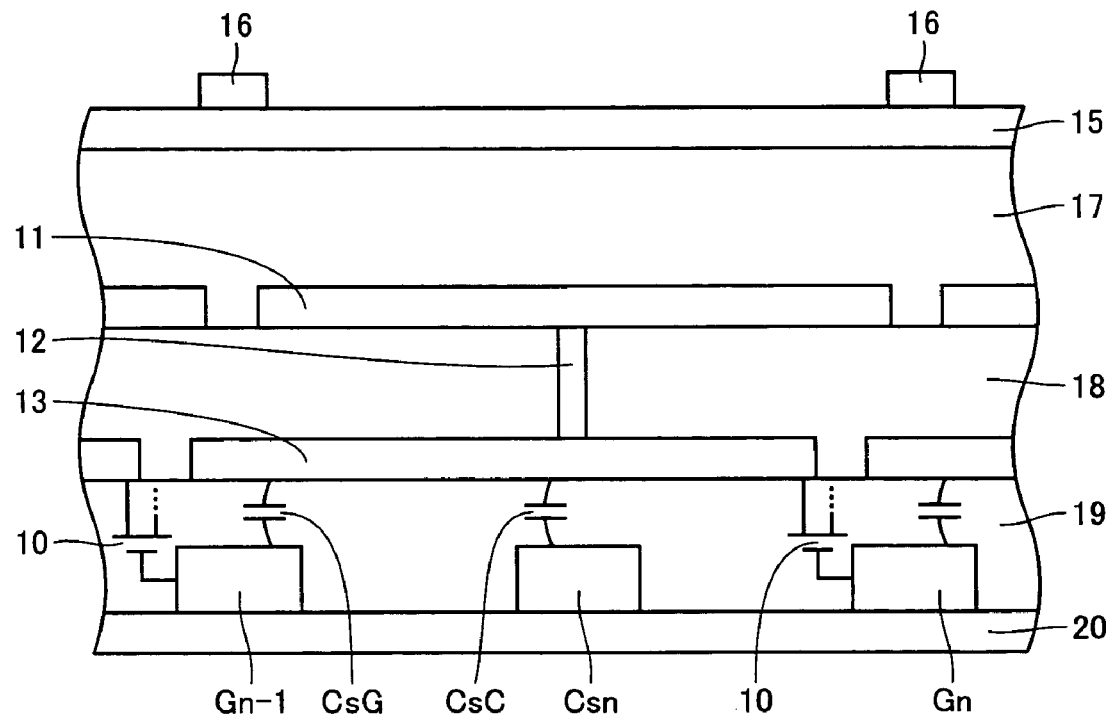
FIG. 2 is a schematic cross-sectional view of the liquid crystal display device in the first embodiment according to the present invention.

FIG. 2 is a schematic cross-sectional view of this construction which is cut along a plane in parallel with the source signal line. FIG. 2 is not a completely realistic cross-sectional view, and partially includes representations for a circuit diagram. It is shown that cross sections of gate signal line Gn−1, auxiliary capacity wiring Csn and gate signal line Gn are respectively arranged on a substrate 20. A transparent insulation film 19 covers the wirings. Auxiliary electrode 13 is arranged on an upper side of transparent insulation film 19. TFT element 10 is formed in transparent insulation film 19 with auxiliary electrode 13, an electrode extending from the source signal line (not shown in FIG. 2; see FIG. 1) and gate signal line Gn. An upper side of auxiliary electrode 13 is covered with a transparent insulation film 18, and pixel electrode 11 is arranged on an further upper side thereof. Pixel electrode 11 and auxiliary electrode 13 are electrically connected with each other by a contact hole 12 (not shown in FIG. 1; see FIG. 2). Therefore, pixel electrode 11 and auxiliary electrode 13 always have the same potential. A liquid crystal layer 17 is arranged on an upper side of pixel electrode 11 via an alignment layer (not shown). An opposed electrode 15 is arranged on an upper side of liquid crystal layer 17, again via an alignment layer (not shown). A black matrix 16 is partly arranged on an upper side of the opposed electrode. When seen two-dimensionally, black matrix 16 is arranged in a grid line pattern so as to cover gaps between the adjacent pixel electrodes. Alternatively, it may be formed so as to cover the gate signal lines or the source signal lines to cut off reflected light of outside light at the gate signal lines or the source signal lines. The pixel electrode and the opposed electrode is formed with a transparent conductive material.

Figure 3:
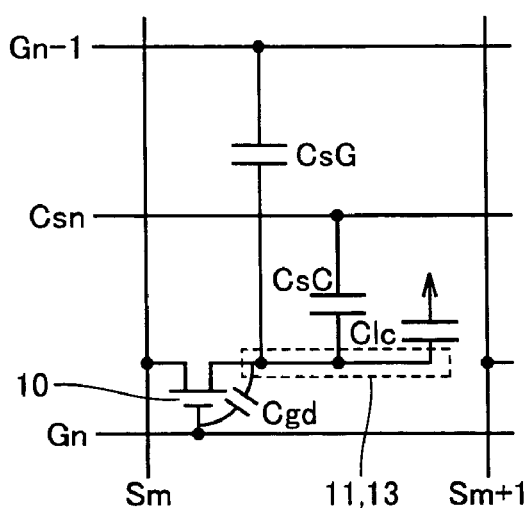
FIG. 3 is a circuit diagram corresponding to one pixel of the liquid crystal display device in the first embodiment according to the present invention.

FIG. 3 shows a circuit diagram of this construction. A portion enclosed with dotted line indicates a position in the circuit construction occupied with pixel electrode 11 and auxiliary electrode 13.

In the liquid crystal display device according to this embodiment, both of a portion forming auxiliary capacity CsG as Cs on Gate by overlapping of auxiliary electrode 13 continuously having the same potential as pixel electrode 11 with gate signal line Gn−1, and a portion forming auxiliary capacity CsC as Cs on Common by overlapping of the auxiliary electrode with auxiliary capacity wiring Csn are present, and thus the auxiliary capacity can increase. In this construction, with retaining an aperture ratio as high as a conventional construction only with Cs on Common, the auxiliary capacity can be made larger as compared with the construction only with Cs on Common.

As the auxiliary capacity can be provided from both of Cs on Common and Cs on Gate in the present invention, the auxiliary capacity allocated to one pixel will be a sum of the two. Therefore, even when the auxiliary capacity of each of Cs on Common and Cs on Gate is made smaller to some extent, the auxiliary capacity equal to or larger than that with only one of them can be ensured. Considering this point, in the present invention, an auxiliary capacity line for forming Cs on Common and a gate signal line for forming Cs on Gate can respectively be made thinner as the auxiliary capacity of each of Cs on Common and Cs on Gate is made smaller. As a result, the problem of decreased aperture ratio, which is one of the demerits of the structure only with Cs on Common, can be solved and the aperture ratio can be sufficiently high. In addition, as the auxiliary capacity line and the gate signal line can be made thinner, a smaller pixel structure can be formed, which is advantageous to acquire a high definition pixel structure. Furthermore, as the auxiliary capacity can be added by Cs on Common in the present invention, a load of Cs on Gate becomes smaller as compared with the structure only with Cs on Gate, and thus the problem of increased power consumption, which is one of the demerits of the structure of Cs on Gate, can be suppressed.

Second Embodiment

Figure 4:
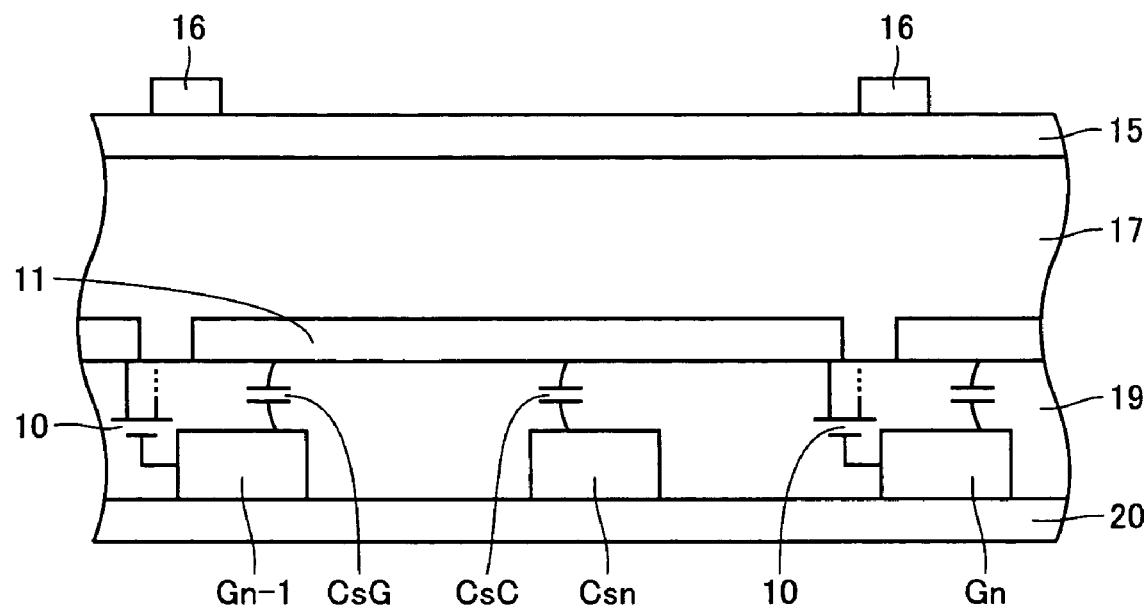
FIG. 4 is a schematic cross-sectional view of a liquid crystal display device in a second embodiment according to the present invention.

Though the liquid crystal display device is described in the first embodiment assuming that it has a so-called SHA (Super High Aperture) structure, in which auxiliary electrode 13 and transparent insulation film 18 are interposed between a layer having TFT element 10 arranged therein and pixel electrode 11 to increase an aperture ratio, the present invention is also applicable to a liquid crystal display device not having the SHA structure. Therefore, an example of application of the present invention to a liquid crystal display device having non-SHA structure is described as a liquid crystal display device in a second embodiment according to the present invention. FIG. 4 shows, similarly as FIG. 2 of the first embodiment, an example of a schematic cross-sectional view of the liquid crystal display device in this embodiment. Cross sections of gate signal line Gn−1, auxiliary capacity wiring Csn and gate signal line Gn are respectively arranged on substrate 20. Transparent insulation film 19 covers the wirings. Pixel electrode 11 is arranged on an upper side of transparent insulation film 19. TFT element 10 is formed in transparent insulation film 19 with a portion of pixel electrode 11, an electrode extending from the source signal line (not shown) and gate signal line Gn. A structure of an upper side of pixel electrode 11 is similar to that shown in FIG. 2.

In this embodiment, effects similar to those in the first embodiment can be attained.

A dummy gate signal line and a dummy pixel electrode, which are applicable to both the first and second embodiments, are described in the following.

Figure 5:
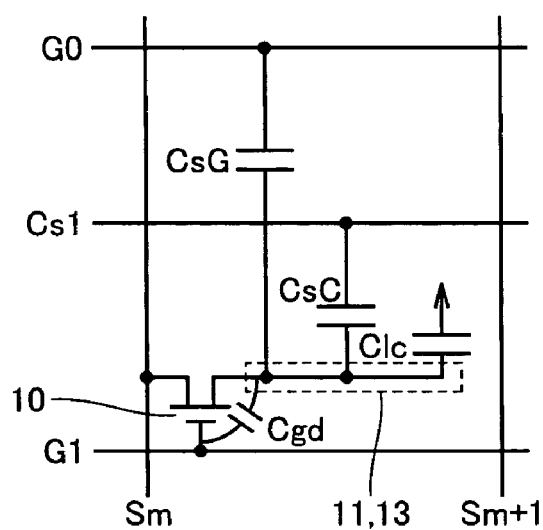
FIG. 5 is a circuit diagram of a region near a dummy gate signal line in an example of the liquid crystal display device in the first or second embodiment according to the present invention including the dummy gate signal line.

To apply the present invention, a gate signal line of an (n−1)th column is needed to form Cs on Gate for a pixel electrode of an nth column. Therefore, a gate signal line of a 0th column is needed to form Cs on Gate for a pixel electrode of a first column. The gate signal line of the 0th column is not necessarily a signal line to provide a signal to the gate of a TFT element for driving a pixel electrode. It is a signal line arranged only to form Cs on Gate for a pixel electrode of the first column. It can be referred to as a kind of "dummy gate signal line" from a relative location thereof. An example thereof is shown in FIG. 5. G0 is the dummy gate signal line.

In the liquid crystal display device including such dummy gate signal line, each of a plurality of pixel electrodes includes corresponding auxiliary electrode and TFT element, and it can be said that one of the group of gate signal lines located in an end position of one side (the dummy gate signal line) has a portion forming a capacitor by overlapping with the auxiliary electrode, and is not connected to any of TFT element.

Figure 6:
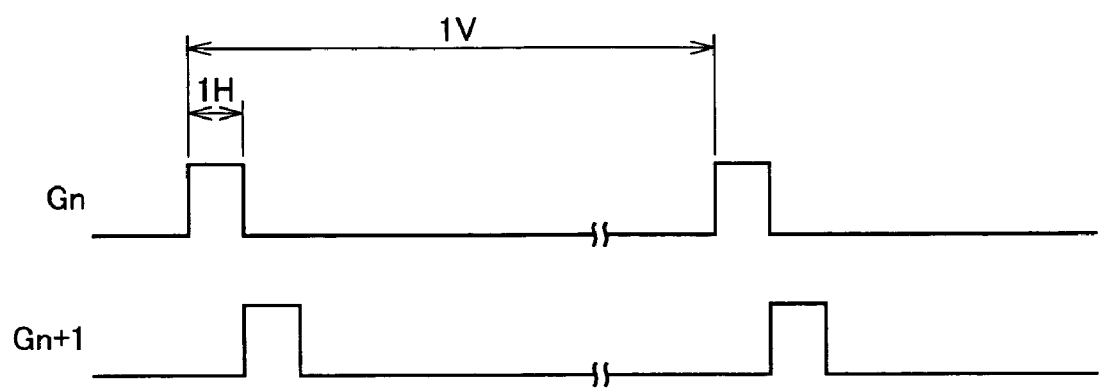
FIG. 6 is a time chart showing signal application states in gate signal lines Gn and Gn+1 of the liquid crystal display device in the first or second embodiment according to the present invention.
Figure 7:
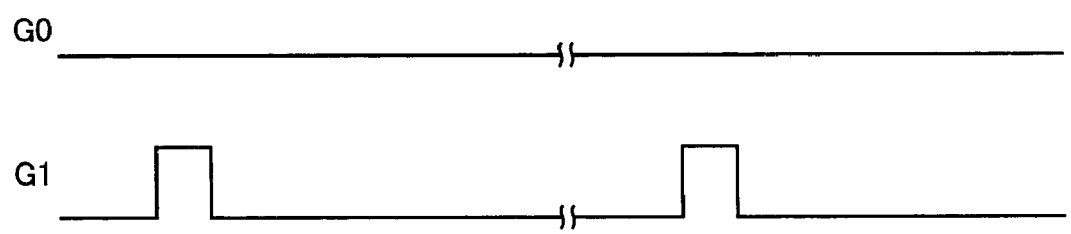
FIG. 7 is a time chart showing signal application states in gate signal lines G0 and G1 of the liquid crystal display device in the first or second embodiment according to the present invention.

To drive the liquid crystal display device having such construction, when the group of gate signal lines are indicated with G0, G1, G2, . . . , Gp in order of arrangement position, a line of pixels (generally a horizontal line) along the gate signal line is selected one by one regarding to G1 to Gp in this order, a potential corresponding to content of a picture to be displayed is provided to each pixel electrode arranged in the selected one line from the source signal line for a certain time, and a constant potential is provided to the pixel electrodes belonging to all of not-selected lines. After a selection of Gp, the steps are repeated from G1, and during these steps, the constant potential is continuously provided to G0. That is, as shown in FIG. 6, when a line corresponding to general gate signal line Gn other than G0 is noted, a timing of scanning comes in a constant cycle generally called "1V" (a cycle of vertical synchronization, which is also referred to as a "vertical period"), and a potential corresponding to content of a picture is applied to each pixel electrode belonging to this line from the source signal line during a time called "1H" (a cycle of horizontal synchronization, which is also referred to as a "horizontal period"). In each of FIGS. 6 and 7, a horizontal axis indicates an elapsed time and a vertical axis indicates a voltage. After time 1H in gate signal line Gn elapsed, an object of application is shifted to a line corresponding to gate signal line Gn+1. As shown in FIG. 7, the potential corresponding to the content of picture is also applied to each pixel electrode belonging to a line corresponding to gate signal line G1 in a constant cycle, as part of a cycle of this scanning. To dummy gate signal line G0, however, the potential for displaying picture is not applied, and a constant potential corresponding to non-display of the picture is continuously applied.

Figure 8:
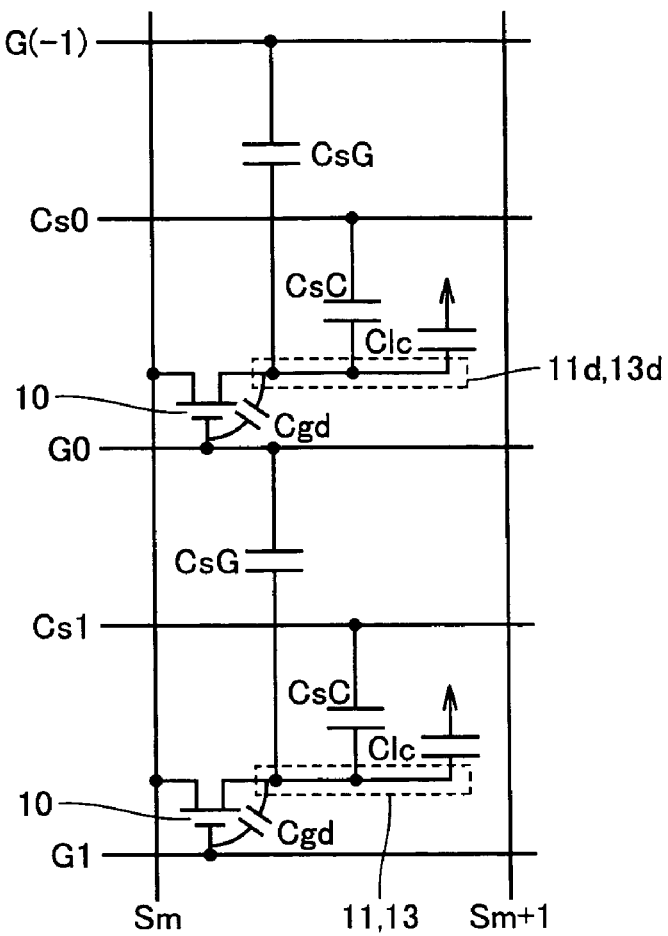
FIG. 8 is a circuit diagram of a region near a dummy pixel electrode in an example of the liquid crystal display device in the first or second embodiment according to the present invention including the dummy pixel electrode.

A "dummy pixel electrode" may be arranged in addition to the dummy gate signal line as described above. FIG. 8 shows a structure of a region near the dummy pixel electrode in such example. A region between gate signal lines G0 and G(−1) is a dummy pixel region in which a dummy pixel electrode 11d is arranged. An auxiliary electrode 13d arranged on a lower side of pixel electrode 11d so as to have the same potential as dummy pixel electrode 11d is also a dummy electrode. Actually, all pixel electrodes of a column laterally extending from FIG. 8 correspond to dummy pixel electrodes. Thus, it can be said that there is a "dummy pixel electrode column".

In the liquid crystal display device including such dummy pixel electrodes, each pixel electrode includes corresponding auxiliary electrode and TFT element, and it can be said that a pixel electrode located between two of the group of gate signal lines in first and second positions from an end of one side, that is to say, a dummy electrode is not for displaying.

To drive the liquid crystal display device having such construction, when a column of the pixel electrodes located between two of the group of the gate signal lines in first and second positions from an end of one side is made to be a dummy pixel electrode column and the other columns of the pixel electrodes are made to be active pixel electrode columns, a column is selected one by one in order of arrangement position over all of the active pixel electrode columns, a potential corresponding to content of a picture to be displayed is provided to the pixel electrodes of the selected one column, a constant potential is provided to the pixel electrodes of the other columns, and such scanning is repeated from one end to the other end of an arrangement of active pixel electrode columns, while the constant potential is continuously provided to the pixel electrodes in the dummy pixel electrode column.

The dummy pixel electrode may be covered with the aforementioned black matrix to avoid an effect of the dummy pixel electrode on display.

A further function attained when the auxiliary capacity is increased according to the present invention will now be described.

Hereinafter, CsC represents an auxiliary capacity with Cs on Common, CsG represents an auxiliary capacity with Cs on Gate, Clc represents an liquid crystal capacity, and Cgd represents a parasitic capacity between the gate and drain of TFT element. $Vg_{p-p}$ represents an amplitude (peak to peak) of a gate voltage.

A potential difference resulting from dropping of a potential of the pixel electrode to a negative side by an effect of a gate signal with an existence of Cgd is hereinafter referred to as a "drop voltage". Auxiliary capacity Cs has a function of minimizing the drop voltage ΔV. Generally, drop voltage ΔV can be expressed as follows.

$$\Delta V = Vg_{p-p} \times \alpha \quad \text{expression 1}$$

where $$\alpha = \frac{Cgd}{Clc + Cgd + Cs} \quad \text{expression 2}$$

Therefore, as auxiliary capacity Cs becomes larger, ΔV becomes smaller.

In addition, the following expressions can be led from expression 2.

$$\alpha(Cs \text{ on Common}) = \frac{Cgd}{Clc + Cgd + CsC} \quad \text{expression 3}$$

$$\alpha(Cs \text{ on Gate}) = \frac{Cgd}{Clc + Cgd + CsG} \quad \text{expression 4}$$

$$\alpha(Cs \text{ on Common } \& \text{ } Cs \text{ on Gate}) = \quad \text{expression 5}$$

$$\frac{Cgd}{Clc + Cgd + CsC + CsG}$$

where α(Cs on Common), α(Cs on Gate) and α(Cs on Common & Cs on Gate) respectively represent α values in a structure only with Cs on Common, in a structure only with Cs on Gate and in a structure with combined Cs on Common and Cs on Gate in one pixel electrode according to the present invention.

From expressions 2, 3 and 4, the following relations are held.

$$\alpha(Cs \text{ on Common } \& \text{ } Cs \text{ on Gate}) < \alpha(Cs \text{ on Common}) \quad \text{expression 6}$$

$$\alpha(Cs \text{ on Common } \& \text{ } Cs \text{ on Gate}) < \alpha(Cs \text{ on Gate}) \quad \text{expression 7}$$

In the present invention using combined Cs on Common and Cs on Gate in one pixel, the α value becomes smaller than that in the conventional structure only with Cs on Common or Cs on Gate. It is apparent with consideration of expression 1 that the present invention can make ΔV smaller and enhance performance of pixel drive.

It is to be noted that, though TFT is illustrated as the switching element in the aforementioned embodiments, this is not a limitation, and an MIM, a diode or a thyristor may also be used.

Third Embodiment

A liquid crystal display device in a third embodiment according to the present invention will now be described. With the liquid crystal display device as described in the first or second embodiment, which is a type of using combined Cs on Common and Cs on Gate in one pixel (hereinafter referred to as a "combined type"), an optimal state is not always obtained with simple combination, and there is a more preferable construction of the combined type. An optimal construction of the combined type is described from the third embodiment.

A flicker is noted here as one of malfunctions occur in a product. The flicker is a phenomenon of flickering of a screen. The flicker is generated in a liquid crystal display device on a principle as described in the following.

Figure 9:
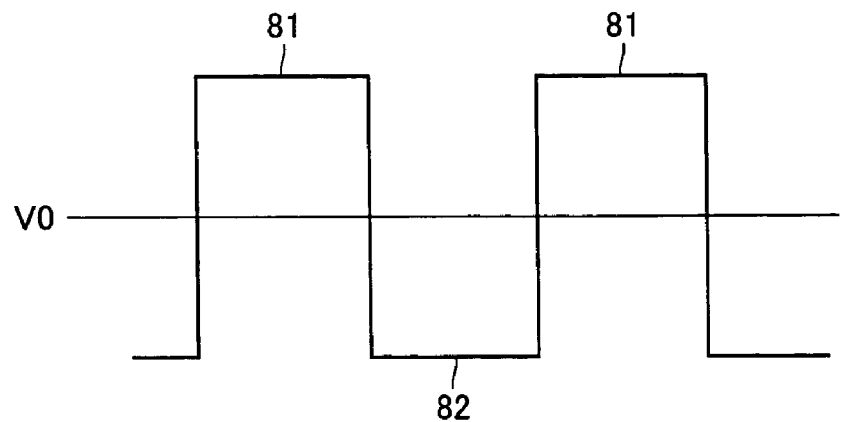
FIG. 9 is a first diagram to describe how positive and negative signals are alternately applied to a pixel electrode.

As shown in FIG. 9, a pixel electrode usually displays an image by alternately receiving a signal 81 which is positive to a potential of an opposed electrode, that is, an opposed potential V0, and a signal 82 which is negative. Potential differences with opposed potential V0 should be equalized to uniformly display the image during both applications of positive and negative signals. Herein, a potential generated in the pixel electrode is not a source potential of TFT element itself, but it is a potential obtained by subtracting drop voltage ΔV from the source potential. Therefore, the potential of the opposed electrode and the source potential are set to allow a resulting equal absolute value of potential differences between the pixel electrode and the opposed electrode for both applications of positive and negative signals, in consideration of a decrement of the potential by drop voltage ΔV.

Figure 10:
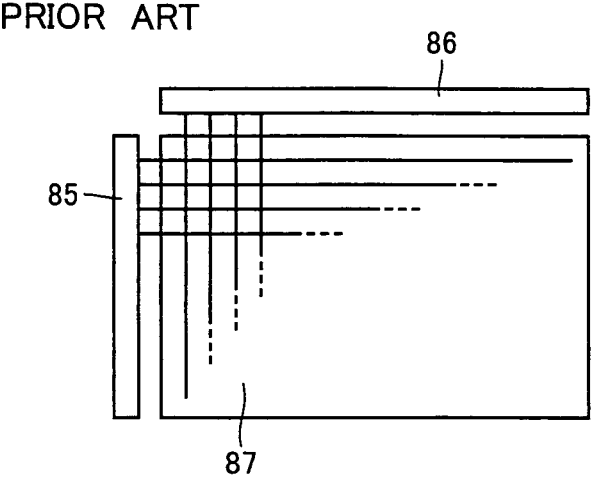
FIG. 10 is a conceptual diagram of a relation between a screen and drivers in a general single-bank drive situation.

In reality, however, the potential generated in the pixel electrode is not equal to the potential obtained by subtracting drop voltage ΔV from the source potential, but it is incremented again by a drop relaxation voltage ΔVc (described in detail below). A value of drop relaxation voltage ΔVc is determined depending on a distance of wiring from a gate driver to the pixel electrode. As shown in FIG. 10, a gate driver 85 and a source driver 86 are respectively arranged on the outsides of longitudinal and lateral sides of a screen 87. In a situation of a so-called single-bank drive, that is, when gate driver 85 is arranged only on the outside of a left side of the screen as shown in FIG. 10, a distance of wiring from gate driver 85 widely differs depending on a position of the pixel electrode. Thus, the value of drop relaxation voltage ΔVc varies depending on a position of the pixel electrode on the screen.

Figure 11:
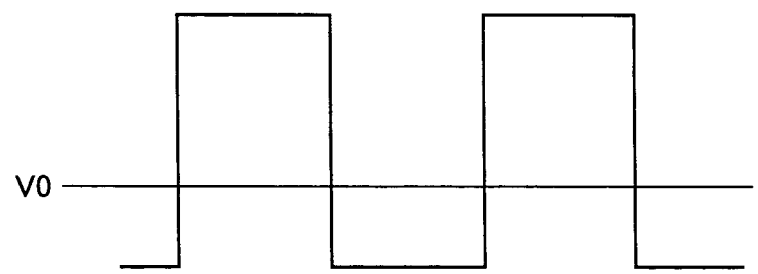
FIG. 11 is a second diagram to describe how positive and negative signals are alternately applied to the pixel electrode.

The value of drop relaxation voltage ΔVc varies with a region on the screen. Therefore, a degree of an increment of drop relaxation voltage ΔVc in the potential of the pixel electrode differs with a different region on the screen, and thus in some regions on the screen, potential differences with the opposed electrode will not be equal for applications of positive and negative signals; as shown in FIG. 11. Such shift in the potential differences with the opposed electrode is referred to as an "opposed voltage shift". The "opposed voltage shift" is more precisely defined as a difference between maximal and minimal values of drop relaxation voltage ΔVc throughout the screen. When the opposed voltage shift becomes large to some degree, it is recognized as a flicker by a user.

Herein, Vgh represents a potential of a High signal of a gate signal provided to the gate electrode of TFT element, and Vgl represents a potential of a Low signal. Vth represents a potential difference needed to maintain an ON state of TFT, that is, a TFT threshold value. A potential realized by potential difference Vth is represented as vTFT.

When the potential of the gate signal is switched from Vgh to Vgl, the potential of the pixel electrode decreases by an effect of parasitic capacity Cgd between the gate and drain. In theory, however, the potential becomes stable after decreased to a certain degree. A voltage corresponding to a decrement of this decrease is drop voltage ΔV, which is also described in the second embodiment.

Figure 12:
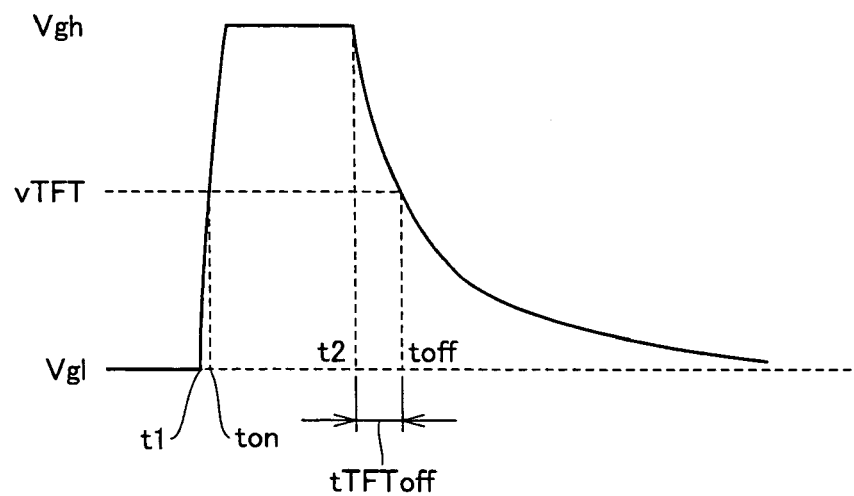
FIG. 12 is a conceptual diagram showing a variation in a potential of a gate electrode, which is assumed in a third embodiment according to the present invention.

A time when TFT element is switched from an ON state to an OFF state is considered. During the ON state, potential Vgh is applied to the gate electrode of the TFT element as the gate signal. When the gate signal is switched from Vgh to Vgl to switch TFT element to the OFF state, the potential of the gate electrode does not immediately change from Vgh to Vgl. In reality, as shown in FIG. 12, the potential decreases toward Vgl in a curve over a certain time. In FIG. 12, a horizontal axis indicates an elapsed time and a vertical axis indicates an actual potential of the gate electrode.

While the actual potential of the gate electrode is decreasing toward Vgl, TFT element is actually switched to the OFF state when the potential difference between the gate electrode and the source becomes lower than potential vTFT as TFT threshold value Vth. Thus, there is a difference between a time t2 when the gate signal provided to TFT element is switched to Vgl and a time toff when TFT element is actually set to the OFF state. Length of this time difference is represented as tTFToff.

Though TFT element should be set to the OFF state in a period from time t2 to time toff in theory, it is still in the ON state in reality and thus charging is performed. Though the potential of the pixel electrode is decreasing in the period from time t2 to time toff, charging is performed on the other hand. In theory, a final stable value of the potential of the pixel electrode should be a value decremented by drop voltage ΔV. In reality, however, it is only decremented by ΔV−ΔVc because of the charging performed during the period from time t2 to time toff. A component ΔVc of increment in the potential drop is referred to as a "drop relaxation voltage".

Length tTFToff of a charging time is expressed as the following expression 8.

$$tTFToff = toff - t2 \quad \text{expression 8}$$
$$= -Rg \times (Cg + Nm/(1/Csg +$$

-continued
$$1/(Clc + Cscom))) \times$$
$$\ln(Voff/Vgh - Vgl)$$

Herein, each of indications represents a meaning as follows.

Nm: a number of pixels in a horizontal direction
Rg: a resistance for one gate wiring
Cg: a capacity for one gate wiring (a capacity on an assumption that it is not connected to each pixel electrode)
Csg: a capacity of Cs on Gate per one pixel
Cscom: a capacity of Cs on Common per one pixel
Clc: a liquid crystal capacity per one pixel
Voff: a potential difference of a gate electrode to Vgl at switching of ON/OFF state of TFT element $$Voff = V\gamma + vTFToff - Vgl$$

Vγ: a source potential determined depending on a gradation

Figure 13:
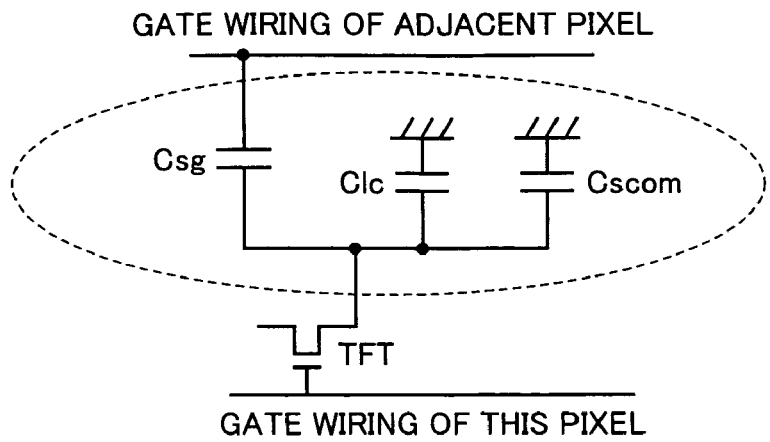
FIG. 13 is a circuit diagram showing connections of Csg, Clc and Cscom to a TFT element in one pixel, which is assumed in the third embodiment according to the present invention.

FIG. 13 shows relations of connections of Csg, Clc and Cscom to TFT element in one pixel.

A resistance Ron at a time when TFT element is set to the ON state is expressed as the following expression 9.

$$Ron = (ton-t2)/Cpixl \times \ln((V\gamma - Vcharge)/V\gamma) \quad \text{expression 9}$$

ton: a time when TFT element is actually set to the ON state
Cpixl: a total capacity relating to one pixel $$Cpixl = Clc + Cscom + Csg + Cgd$$

Cgd: a parasitic capacity between the gate and drain per one pixel
Vcharge: a voltage actually charged in the liquid crystal Drop relaxation voltage ΔVc generated resulting from obtuseness of a waveform when the gate signal is set to the OFF state can be expressed as the following expression 10.

$$\Delta Vc = \Delta V/(Ron \cdot Cpixl) \cdot [t + Rg \cdot Cgi \cdot \exp(-t/(Rg \cdot Cgi))]_0^{tTFToff} \quad \text{expression 10}$$

Herein, Cgi=Cg+Nm/(1/Csg+1/(Clc+Cscom)). In expression 10, a portion $[\ ]_0^{tTFToff}$ means an integral in regard to t from 0 to tTFToff.

$$\Delta V = Cgd/Cpixl \cdot (Vgh - Vgl)$$

A minimal value of the opposed voltage shift required to recognize the flicker will now be described.

As a precondition for a simulation, it is assumed that an applied voltage of a liquid crystal is up to 4 V, and 64 levels of halftone are displayed within the range. It is assumed that a difference between maximal and minimal values of luminance is 250 cd/m². A minimal value of a luminance difference with the opposed voltage shift to recognize the flicker, which value is obtained by an experiment, is 4 cd/m².

$$4V \times (4\ cd/m^2 \div 250\ cd/m^2) \approx 0.06V$$

Therefore, the flicker can be recognized when the opposed voltage shift of about 0.06 V or larger is generated.

To avoid generation of recognizable flicker in the single-bank drive, drop relaxation voltage ΔVc expressed as expression 10 should be 0.06 V or lower.

Figure 14:
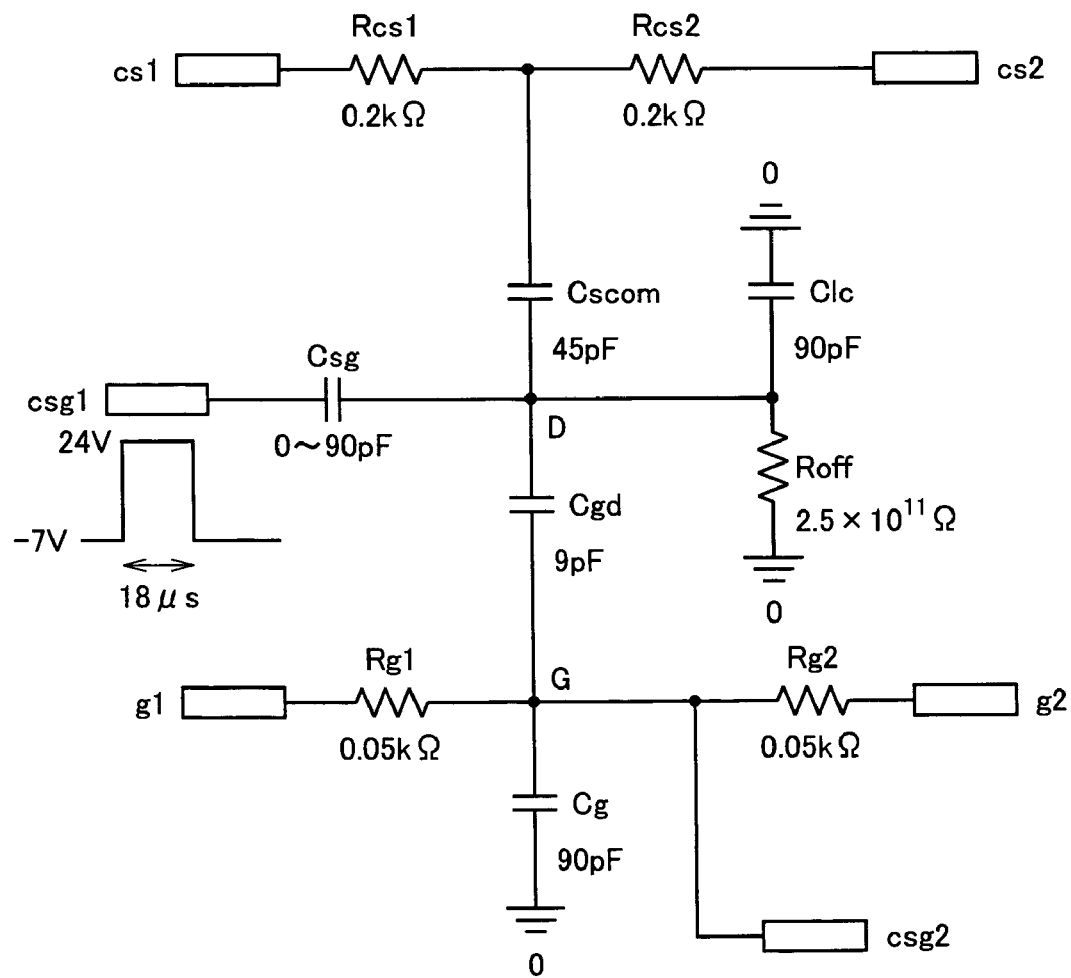
FIG. 14 is a circuit diagram of a simulation model assumed in the third embodiment according to the present invention.

A model as shown in FIG. 14 was constructed, and a simulation was performed to examine a degree of generation of the opposed voltage shift. The model shown in FIG. 14 was formed with the circuit construction of FIG. 13 considering a resistance of wiring or the like. Though an actual screen of an XGA (extended Graphic Array) standard has 1024×3 colors=3072 pixel electrodes arranged in a lateral direction, in the simulation, a number of pixel electrodes arranged in a lateral direction was set to 10, which corresponds to approximately 1/300 of an actual number. Besides such simplification, however, a resistance value and a capacity value per one pixel were set to 300 times the values in one pixel in reality to match a total resistance value and a total capacity value for one row arranged in a lateral direction with actual values.

Each of small rectangles shown in FIG. 14 indicates a source of a potential. Variables in FIG. 14 represent meanings as follows.

Figure 15:
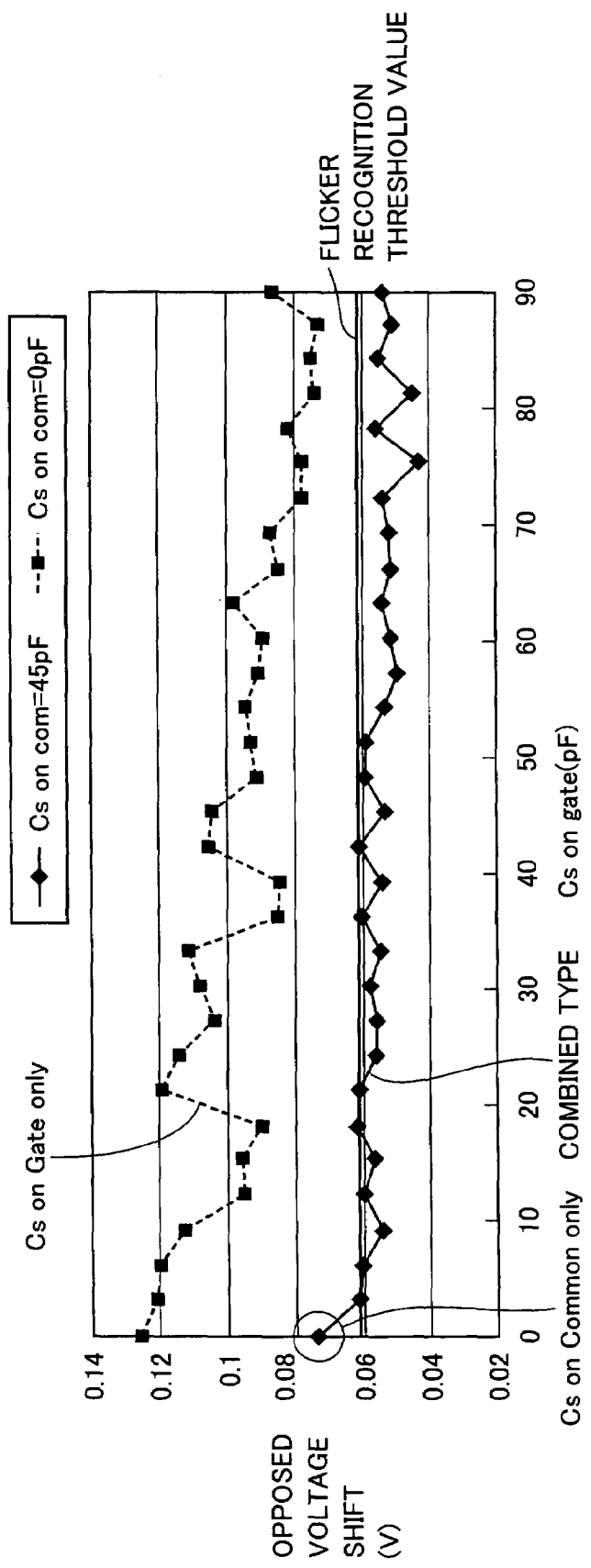
FIG. 15 is a graph showing a result of the simulation performed in the third embodiment according to the present invention.

Csg: a Cs-on-Gate capacity
Cscom: a Cs-on-Common capacity
Clc: a liquid crystal capacity
Rcs1, Rcs2: resistances of auxiliary capacity wiring
Rg1, Rg2: resistances of a left side and a right side, respectively, of gate wiring per one pixel
Roff: a drain electrode leak component
Cg: a capacity of gate wiring, which capacity is not connected to individual pixel electrode
Cgd: a parasitic capacity between the gate and drain A simulation was performed in this model. A screen of XGA standard having a size of 15 inches is assumed. The simulation was performed for three structures, that is, a structure only with Cs on Gate, a structure only with Cs on Common and a structure of the combined type. As shown in FIG. 14, Cscom was fixed to 45 pF. Csg was varied within a range from 0 to 90 pF, and the simulation was respectively performed. A result is shown in FIG. 15. In FIG. 15, the minimal value of the opposed voltage shift to recognize the flicker (hereinafter referred to as a "flicker recognition threshold value") is indicated with a straight line. The flicker recognition threshold value is a value slightly larger than 0.06 V.

The opposed voltage shift was large in the structure only with Cs on Gate, and the value thereof was larger than the flicker recognition threshold value even when Csg was set to as a large value as 90 pF. The opposed voltage shift also became larger than the flicker recognition threshold value in the structure only with Cs on Common. That is, the flicker was recognizable in both structures, only with Cs on Gate and only with Cs on Common.

In contrast, the opposed voltage shift became smaller than the flicker recognition threshold value in the combined type. That is, a state without generation of recognizable flicker could be made.

Though Cscom was fixed to 45 pF in FIG. 15, a liquid crystal display device without recognizable flicker as shown in FIG. 15 can be obtained provided that Cscom is 45 pF or higher. The state of Cscom being 45 pF means that the auxiliary capacity wiring has a width Wcscom of 10 μm. When width Wcscom of the auxiliary capacity wiring was made smaller than 10 μm, the opposed voltage shift could not reliably be made smaller than the flicker recognition threshold value. Therefore, a preferable condition to avoid generation of the flicker is to set the width of the auxiliary capacity wiring to 10 μm or larger.

Thus, the liquid crystal display device in the third embodiment according to the present invention is the liquid crystal display device having a width of the auxiliary capacity wiring of 10 μm or larger.

Increase in the width of the auxiliary capacity wiring, however, causes decrease in an aperture ratio, and thus it is preferable to set the width of the auxiliary capacity wiring to 10 μm to avoid the decrease in the aperture ratio. Therefore, in the liquid crystal display device in this embodiment, the auxiliary capacity wiring preferably has a width of approximately 10 μm. Other constructions are similar to those described in the first or second embodiment.

With the liquid crystal display device satisfying this condition, generation of recognizable flicker can be suppressed.

Fourth Embodiment

In the simulation in the model shown in FIG. 14, the screen had a size of 15 inches and Cscom was 45 pF. When other screen size is assumed, however, a minimal value of capacity that should be held as Cscom varies. Capacity Cscom preferably satisfies the following expression.

$$Cscom \geq (S/15) \times 45 \text{ pF}$$

where S represents a size of the screen in inches. Capacity Cscom is a capacity of a portion of the auxiliary electrode forming a capacitor by overlapping with the auxiliary capacity wiring.

Thus, a first example of a liquid crystal display device in a fourth embodiment according to the present invention is a liquid crystal display device which satisfies the following expression. Other constructions are similar to those described in the first or second embodiment.

$$Cscom \geq (S/15) \times 45 \text{ pF}$$

Width Wcscom of the auxiliary capacity wiring preferably satisfies the following expression.

$$Wcscom \geq 10 \text{ μm} \times 6.9/\in 2$$

In this expression, the number 6.9 comes from a value 6.9 of relative permittivity $\in 1$ which was used to calculate a capacity value of Cscom in the simulation. In addition, $\in 2$ represents relative permittivity obtained when a capacity of Cscom is formed in a liquid crystal display device having each inch size.

Thus, a second example of the liquid crystal display device in the fourth embodiment according to the present invention is the liquid crystal display device which satisfies the following expression. Other constructions are similar to those described in the first or second embodiment.

$$Wcscom \geq 10 \text{ μm} \times 6.9/\in 2$$

With the liquid crystal display device satisfying the condition described in the first or second example, generation of recognizable flicker can be suppressed.

Fifth Embodiment

In the above-described simulation, Rg1 and Rg2 were respectively set to 0.05 kΩ. Thus, a resistance value of the gate wiring per one pixel is Rg1+Rg2=0.10 kΩ. To avoid generation of a flicker, a value of Rg1+Rg2 must be made equal to or smaller than this value. As it is assumed in this simulation that ten pixels are arranged in a lateral row on the screen, a resistance value per one gate wiring (also referred to as a "gate bus line"), which corresponds to the second signal line in the first embodiment, is 0.10 kΩ×10=1 kΩ. Therefore, to avoid generation of a flicker, the resistance value per one second signal line is preferably equal to or lower than 1 kΩ. The resistance value per one gate wiring as the second signal line equal to or lower than 1 kΩ can be attained by forming the gate wiring with aluminum, chromium, copper, or the like.

Thus, a liquid crystal display device in a fifth embodiment according to the present invention is the liquid crystal display device having a resistance value per one second signal line equal to or lower than 1 kΩ. Other constructions are similar to those described in the first or second embodiment.

Though each of the preferable conditions described in the third to fifth embodiments is efficient to a certain extent by itself, it is more preferable to concurrently satisfy two or more of the conditions, because the effect of suppressing flicker can be obtained more reliably.

Sixth Embodiment

Figure 16:
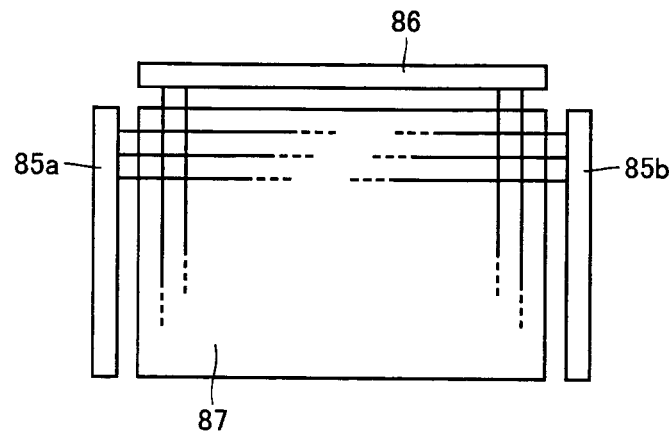
FIG. 16 is a conceptual diagram of a relation between a screen and drivers in a general dual-bank drive situation.
Figure 17:
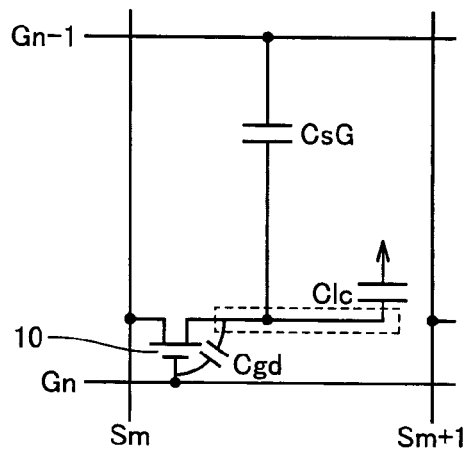
FIG. 17 is a circuit diagram corresponding to one pixel of a liquid crystal display device adopting a Cs on Gate structure according to a prior art.
Figure 18:
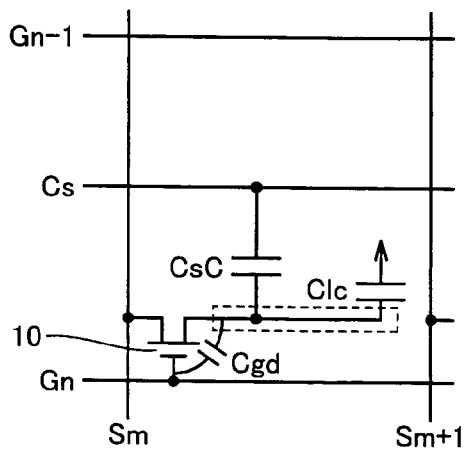
FIG. 18 is a circuit diagram corresponding to one pixel of a liquid crystal display device adopting a Cs on Common structure according to a prior art.

Expressions 8 and 10 are premised on a single-bank drive as shown in FIG. 10. A situation of a dual-bank drive as shown in FIG. 16 will now be considered. In FIG. 16, gate drivers 85a and 85b are arranged on the outside of left and right sides of a screen, and wirings are extending from both left and right sides for pixels within screen 87. Each of gate drivers 85a, 85b covers and drives each half of pixel electrodes arranged within screen 87. A dual-bank drive of N pixels, where N represents a number of pixels arranged from left to right, is equivalent to a single-bank drive of N/2 pixels.

With reference to expression 8 which expresses time difference tTFToff during a switching of TFT element to the OFF state in the single-bank drive, a time difference tTFToffb similarly generated in the dual-bank drive has a relation with time difference tTFToff of the single-bank drive as follows.

$$tTFToffb = tTFToff/4$$

In addition, as both Rg and Cg in the dual-bank drive are halves of those in the single-bank drive, drop relaxation voltage ΔVc can be expressed as the following expression 11.

$$\Delta Vc = \Delta V/(Ron \cdot Cpixl) \cdot [t + (Rg \cdot Cgi/4) \cdot \exp(-t/(Rg \cdot Cgi/4))]_0^{tTFToff} \quad \text{expression 11}$$

To avoid the generation of recognizable flicker in the dual-bank drive, drop relaxation voltage ΔVc expressed as expression 11 should be 0.06 V or lower. Other constructions are similar to those described in the first or second embodiment.

As a load resulting from a resistance of gate wiring also becomes half in the dual-bank drive, a minimal value of resistance is twice the value in the single-bank drive. Therefore, the resistance value per one gate wiring, that is, second signal line is preferably equal to or lower than 2 kΩ. For this condition, other constructions are also similar to those described in the first or second embodiment.

With the liquid crystal display device satisfying either of these conditions, generation of recognizable flicker can be suppressed. The liquid crystal display device satisfying both of the preferable conditions described in this embodiment is more preferable, because the generation of recognizable flicker can be suppressed more reliably.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A liquid crystal display device, comprising:
   a group of first signal lines arranged in parallel;
   a group of second signal lines and a group of auxiliary capacity wirings alternately arranged one by one in parallel so as to intersect with the group of said first signal lines;
   a plurality of switching elements arranged corresponding to intersection points of said first signal lines and said second signal lines;
   a plurality of auxiliary electrodes connected to said plurality of switching elements; and
   a pixel electrode formed on said auxiliary electrode and electrically connected to said auxiliary electrode; wherein
   said auxiliary electrode has a portion forming a capacitor by overlapping with said auxiliary capacity wiring and a portion forming a capacitor by overlapping with said second signal line, and
   the pixel electrode and the auxiliary electrode are laid on each other with a transparent insulation film interposed therebetween.

2. A liquid crystal display device, comprising:
   a group of first signal lines arranged in parallel;
   a group of second signal lines and a group of auxiliary capacity wirings alternately arranged one by one in parallel so as to intersect with the group of said first signal lines;
   a plurality of pixel electrodes arranged in a pixel region defined as each region enclosed with two of the group of said first signal lines which are adjacent with each other and two of the group of said second signal lines which are adjacent with each other;
   an auxiliary electrode connected to each of said pixel electrodes; and
   a thin film transistor corresponding to each of said pixel electrodes; wherein
   said thin film transistor has one side of a source and a drain connected to said first signal line, the other side connected to said auxiliary electrode, and a gate side connected to said second signal line,
   said auxiliary electrode has a portion forming a capacitor by overlapping with said auxiliary capacity wiring and a portion forming a capacitor by overlapping with said second signal line, and
   the pixel electrode and the auxiliary electrode are laid on each other with a transparent insulation film interposed therebetween.

3. The liquid crystal display device according to claim 2, wherein each of said plurality of pixel electrodes includes corresponding said auxiliary electrode and said thin film transistor, and one of the group of said second signal lines located in an end position of one side has a portion forming a capacitor by overlapping with said auxiliary electrode and is not connected to any of said thin film transistor.

4. The liquid crystal display device according to claim 2, wherein each of said pixel electrodes includes corresponding said auxiliary electrode and said thin film transistor, and wherein
   said pixel electrode located between two of the group of said second signal lines in first and second positions from an end of one side does not have a pixel electrode applied thereto.

5. The liquid crystal display device according to claim 1, wherein
   when a group of second signal lines are indicated with G0, G1, G2, . . . , Gp in order of arrangement position, a picture signal to be displayed is successively applied to G1 to Gp in one vertical period, and a constant potential is applied to G0.

6. The liquid crystal display device according to claim 1, wherein
when a column of said pixel electrodes located between two of the group of said second signal lines in first and second positions from an end of one side is made to be a dummy pixel electrode column and the other columns of said pixel electrodes are made to be active pixel electrode columns, a column is selected one by one in order of arrangement position over all of the active pixel electrode columns, a potential corresponding to content of a picture to be displayed is provided to a selected one column of said pixel electrodes, a constant potential is provided to the other columns of said pixel electrodes, and such scanning is repeated from one end to the other end of an arrangement of the active pixel electrode columns, while continuously providing said constant potential to said dummy pixel electrode.

7. A liquid crystal display device, comprising:
a group of first signal lines arranged in parallel;
a group of second signal lines and a group of auxiliary capacity wirings alternately arranged one by one in parallel so as to intersect with the group of said first signal lines;
a plurality of switching elements arranged corresponding to intersection points of said first signal lines and said second signal lines;
a plurality of auxiliary electrodes connected to said plurality of switching elements; and
a pixel electrode formed on said auxiliary electrode and electrically connected to said auxiliary electrode; wherein
said auxiliary electrode has a portion forming a capacitor by overlapping with said auxiliary capacity wiring and a portion forming a capacitor by overlapping with said second signal line, and
a width of said auxiliary capacity wiring is 10 μm or larger.

8. The liquid crystal display device according to claim 1, wherein
a capacity Cscom of a portion of said auxiliary electrode forming a capacitor by overlapping with said auxiliary capacity wiring satisfies $Cscom \geq (S/15) \times 45$ pF where S represents a size of a screen in inches.

9. The liquid crystal display device according to claim 1, wherein
a width Wcscom of said auxiliary capacity wiring satisfies $Wcscom \geq 10 \ \mu m \times 6.9/\in 2$ where $\in 2$ represents relative permittivity of a capacitor formed by overlapping of said auxiliary electrode with said auxiliary capacity wiring.

10. A liquid crystal display device, comprising:
a group of first signal lines arranged in parallel;
a group of second signal lines and a group of auxiliary capacity wirings alternately arranged one by one in parallel so as to intersect with the group of said first signal lines;
a plurality of switching elements arranged corresponding to intersection points of said first signal lines and said second signal lines;
a plurality of auxiliary electrodes connected to said plurality of switching elements; and
a pixel electrode formed on said auxiliary electrode and electrically connected to said auxiliary electrode; wherein
said auxiliary electrode has a portion forming a capacitor by overlapping with said auxiliary capacity wiring and a portion forming a capacitor by overlapping with said second signal line, and
said liquid crystal display device is a single-bank drive, and has a resistance value per one said second signal line of 1 kΩ or smaller.

11. The liquid crystal display device according to claim 1, wherein
said liquid crystal display device is a single-bank drive, and has a drop relaxation voltage $\Delta Vc = \Delta V/(Ron \cdot Cpixl) \cdot [t + Rg \cdot Cg \cdot \exp(-t/(Rg \cdot Cg))]_0^{tTFToff}$ of 0.06 V or smaller.

12. A liquid crystal display device, comprising:
a group of first signal lines arranged in parallel;
a group of second signal lines and a group of auxiliary capacity wirings alternately arranged one by one in parallel so as to intersect with the group of said first signal lines;
a plurality of switching elements arranged corresponding to intersection points of said first signal lines and said second signal lines;
a plurality of auxiliary electrodes connected to said plurality of switching elements; and
a pixel electrode formed on said auxiliary electrode and electrically connected to said auxiliary electrode; wherein
said auxiliary electrode has a portion forming a capacitor by overlapping with said auxiliary capacity wiring and a portion forming a capacitor by overlapping with said second signal line, and
said liquid crystal display device is a dual-bank drive, and has a resistance value per one said second signal line of 2 kΩ or smaller.

13. The liquid crystal display device according to claim 1, wherein
said liquid crystal display device is a dual-bank drive, and has a drop relaxation voltage $\Delta Vc = \Delta V/(Ron \cdot Cpixl) \cdot [t + (Rg \cdot Cg/4) \cdot \exp(-t/(Rg \cdot Cg/4))]_{tTFToff}$ of 0.06 V or smaller.

14. The liquid crystal display device according to claim 2, wherein
a width of said auxiliary capacity wiring is 10 μm or larger.

15. The liquid crystal display device according to claim 2, wherein
a capacity Cscom of a portion of said auxiliary electrode forming a capacitor by overlapping with said auxiliary capacity wiring satisfies $Cscom \geq (S/15) \times 45$ pF where S represents a size of a screen in inches.

16. The liquid crystal display device according to claim 2, wherein
a width Wcscom of said auxiliary capacity wiring satisfies $Wcscom \geq 10 \ \mu m \times 6.9/\in 2$ where $\in 2$ represents relative permittivity of a capacitor formed by overlapping of said auxiliary electrode with said auxiliary capacity wiring.

17. The liquid crystal display device according to claim 2, wherein
said liquid crystal display device is a single-bank drive, and has a resistance value per one said second signal line of 1 kΩ or smaller.

18. The liquid crystal display device according to claim 2, wherein
said liquid crystal display device is a single-bank drive, and has a drop relaxation voltage $\Delta Vc = \Delta V/(Ron \cdot Cpixl) \cdot [t + Rg \cdot Cg \cdot \exp(-t/(Rg \cdot Cg))]_0^{tTFToff}$ of 0.06 V or smaller.

19. The liquid crystal display device according to claim 2, wherein
said liquid crystal display device is a dual-bank drive, and has a resistance value per one said second signal line of 2 k$\Omega$ or smaller.

20. The liquid crystal display device according to claim 2, wherein
said liquid crystal display device is a dual-bank drive, and has a drop relaxation voltage $\Delta Vc = \Delta V/(Ron \cdot Cpixl) \cdot [t + (Rg \cdot Cg/4) \cdot \exp(-t/(Rg \cdot Cg/4))]^{otTFToff}$ of 0.06 V or smaller.

21. A liquid crystal display device, comprising:
a group of first signal lines arranged in parallel;
a group of second signal lines and a group of auxiliary capacity wirings alternately arranged one by one in parallel so as to intersect with the group of said first signal lines;
a plurality of pixel electrodes arranged in a pixel region defined as each region enclosed with two of the group of said first signal lines which are adjacent with each other and two of the group of said second signal lines which are adjacent with each other;
an auxiliary electrode connected to each of said pixel electrodes; and
a thin film transistor corresponding to each of said pixel electrodes; wherein
said thin film transistor has one side of a source and a drain connected to said first signal line, the other side connected to said auxiliary electrode, and a gate side connected to said second signal line,
said auxiliary electrode has a portion forming a capacitor by overlapping with said auxiliary capacity wiring and a portion forming a capacitor by overlapping with said second signal line,
each of said pixel electrodes includes corresponding said auxiliary electrode and said thin film transistor, and
said pixel electrode located between two of the group of said second signal lines in first and second positions from an end of one side does not have a pixel electrode applied thereto.

22. A liquid crystal display device, comprising:
a group of first signal lines arranged in parallel;
a group of second signal lines and a group of auxiliary capacity wirings alternately arranged one by one in parallel so as to intersect with the group of said first signal lines;
a plurality of switching elements arranged corresponding to intersection points of said first signal lines and said second signal lines;
a plurality of auxiliary electrodes connected to said plurality of switching elements; and
a pixel electrode formed on said auxiliary electrode and electrically connected to said auxiliary electrode; wherein
said auxiliary electrode has a portion forming a capacitor by overlapping with said auxiliary capacity wiring and a portion forming a capacitor by overlapping with said second signal line, and
when a group of second signal lines are indicated with G0, G1, G2, . . . , Gp in order of arrangement position, a picture signal to be displayed is successively applied to G1 to Gp in one vertical period, and a constant potential is applied to G0.

23. A liquid crystal display device, comprising:
a group of first signal lines arranged in parallel;
a group of second signal lines and a group of auxiliary capacity wirings alternately arranged one by one in parallel so as to intersect with the group of said first signal lines;
a plurality of switching elements arranged corresponding to intersection points of said first signal lines and said second signal lines;
a plurality of auxiliary electrodes connected to said plurality of switching elements; and
a pixel electrode formed on said auxiliary electrode and electrically connected to said auxiliary electrode; wherein
said auxiliary electrode has a portion forming a capacitor by overlapping with said auxiliary capacity wiring and a portion forming a capacitor by overlapping with said second signal line, and
when a column of said pixel electrodes located between two of the group of said second signal lines in first and second positions from an end of one side is made to be a dummy pixel electrode column and the other columns of said pixel electrodes are made to be active pixel electrode columns, a column is selected one by one in order of arrangement position over all of the active pixel electrode columns, a potential corresponding to content of a picture to be displayed is provided to a selected one column of said pixel electrodes, a constant potential is provided to the other columns of said pixel electrodes, and such scanning is repeated from one end to the other end of an arrangement of the active pixel electrode columns, while continuously providing said constant potential to said dummy pixel electrode.

\* \* \* \* \*